(12) United States Patent
Sasidharan et al.

(10) Patent No.: US 10,963,592 B2
(45) Date of Patent: Mar. 30, 2021

(54) METHOD TO UNLOCK A SECURE DIGITAL MEMORY DEVICE LOCKED IN A SECURE DIGITAL OPERATIONAL MODE

(71) Applicant: Western Digital Technologies, Inc., San Jose, CA (US)

(72) Inventors: Vinod Sasidharan, Bangalore (IN); Hitesh Golechchha, Bangalore (IN); Dinesh Kumar Agarwal, Bangalore (IN)

(73) Assignee: WESTERN DIGITAL TECHNOLOGIES, INC., San Jose, TX (US)

( * ) Notice: Subject to any disclaimer, the term of this patent is extended or adjusted under 35 U.S.C. 154(b) by 150 days.

(21) Appl. No.: 15/929,101

(22) Filed: Feb. 5, 2019

(65) Prior Publication Data

US 2020/0250346 A1 Aug. 6, 2020

(51) Int. Cl.
| | |
|---|---|
| *H04L 29/06* | (2006.01) |
| *G06F 21/78* | (2013.01) |
| *G06F 21/77* | (2013.01) |
| *G06F 12/14* | (2006.01) |
| *G06F 21/46* | (2013.01) |

(52) U.S. Cl.
CPC .......... *G06F 21/78* (2013.01); *G06F 12/1408* (2013.01); *G06F 12/1466* (2013.01); *G06F 21/46* (2013.01); *G06F 21/77* (2013.01); *G06F 2212/2146* (2013.01)

(58) Field of Classification Search
CPC ................................. G06F 21/78; G06F 21/46
See application file for complete search history.

(56) References Cited

U.S. PATENT DOCUMENTS

| 7,055,148 | B2 | 5/2006 | Marsh et al. |
| 7,089,547 | B2 | 8/2006 | Goodman et al. |
| 7,188,225 | B1* | 3/2007 | Therene .............. G06F 11/1441 711/112 |
| 7,330,982 | B1 | 2/2008 | Mehr |
| 7,752,676 | B2 | 7/2010 | Hartung et al. |
| 7,836,236 | B2* | 11/2010 | Chou ..................... H01R 13/26 710/301 |
| 7,849,514 | B2 | 12/2010 | Usov et al. |
| 8,195,945 | B2* | 6/2012 | Andersson ............ G06F 21/575 713/175 |
| 8,300,831 | B2 | 10/2012 | Kahler et al. |
| 8,353,053 | B1 | 1/2013 | Chebiyyam |

(Continued)

FOREIGN PATENT DOCUMENTS

| CN | 104636688A A | 5/2015 |
| WO | 2009110140 A1 | 9/2009 |

OTHER PUBLICATIONS

U.S. Appl. No. 15/929,101, filed Feb. 5, 2019, Vinod Sasidharan.

(Continued)

*Primary Examiner* — Shawnchoy Rahman
(74) *Attorney, Agent, or Firm* — Patterson & Sheridan, LLP; Steven H. Versteeg

(57) ABSTRACT

A memory device operable in either of a Secure Digital operational mode and an NVMe operational mode includes password conversion logic to enable the memory device user-mode memory blocks to be accessed in the NVMe operational mode after the memory device was locked in the Secure Digital operational mode.

20 Claims, 11 Drawing Sheets

(56) References Cited

U.S. PATENT DOCUMENTS

| | | | |
|---|---|---|---|
| 8,494,170 | B2 | 7/2013 | Kahler et al. |
| 8,522,322 | B2 | 8/2013 | Wishman et al. |
| 8,560,823 | B1 | 10/2013 | Aytek et al. |
| 8,661,259 | B2 | 2/2014 | Yocom-Piatt et al. |
| 8,812,854 | B2 | 8/2014 | Shah et al. |
| 9,256,744 | B2 | 2/2016 | Hsu |
| 9,734,339 | B2 | 8/2017 | Jeansonne et al. |
| 9,792,439 | B2 | 10/2017 | Colnot |
| 9,853,811 | B1 | 12/2017 | Levy et al. |
| 9,900,325 | B2 | 2/2018 | Semenko et al. |
| 10,116,653 | B2 * | 10/2018 | Rathineswaran ... H04L 63/0846 |
| 2004/0076043 | A1 | 4/2004 | Boals et al. |
| 2006/0080540 | A1 * | 4/2006 | Arnon ................ G06F 21/53 |
| | | | 713/182 |
| 2006/0143600 | A1 | 6/2006 | Cottrell et al. |
| 2007/0061879 | A1 * | 3/2007 | Dailey ................ G06F 21/31 |
| | | | 726/19 |
| 2009/0241103 | A1 | 9/2009 | Pennisi et al. |
| 2009/0327741 | A1 | 12/2009 | Zimmer et al. |
| 2011/0010517 | A1 * | 1/2011 | Fujimura ............ G06F 21/78 |
| | | | 711/164 |
| 2011/0087872 | A1 | 4/2011 | Shah et al. |
| 2011/0307709 | A1 * | 12/2011 | Cox .................... G06F 21/80 |
| | | | 713/183 |
| 2012/0102331 | A1 * | 4/2012 | Russo ................. G06F 21/80 |
| | | | 713/183 |
| 2012/0110343 | A1 | 5/2012 | Bandic et al. |
| 2013/0019305 | A1 * | 1/2013 | Berenbaum ........ G06F 12/1408 |
| | | | 726/19 |
| 2014/0164725 | A1 | 6/2014 | Jang et al. |
| 2014/0275807 | A1 * | 9/2014 | Redei ................. G16H 30/40 |
| | | | 600/300 |
| 2015/0128234 | A1 * | 5/2015 | Xavier ............... H04L 63/0869 |
| | | | 726/6 |
| 2017/0097830 | A1 | 4/2017 | Ehrenberg et al. |
| 2018/0188986 | A1 | 7/2018 | Webster |

OTHER PUBLICATIONS

U.S. Appl. No. 16/365,346, filed Mar. 26, 2019, Tino Lin.

"How to Set a Firmware Password on Your Mac", Aug. 28, 2013.

Ralp C. Merkle, Protocols for Public Key Cryptosystems, ELXSI International, Symposium on Security and Privacy, © 1980 IEEE, available at http://www.merkle.com/papers/Protocols.pdf, accessed on Sep. 19, 2019.

STMicroelectronics NV, Overview secure firmware install (SFI), Application Note, AN4992, available at https://www.st.com/content/ccc/resource/technical/document/application_note/group1/fb/aa/74/3f/a8/a9/49/a8/DM00355688/files/DM00355688.pdf/jcr:content/translations/en.DM00355688.pdf, accessed on Oct. 30, 2019. p. 6.

* cited by examiner

METHOD TO UNLOCK A SECURE DIGITAL MEMORY DEVICE LOCKED IN A SECURE DIGITAL OPERATIONAL MODE

BACKGROUND

Secure Digital refers to both a non-volatile memory card format developed by the Secure Digital Card Association (SDA) for use in portable devices such as solid state drives (SSDs), and protocols for interacting with such devices. Secure Digital includes, presently, five card families available in three different sizes. The five families are the original Standard-Capacity (SDSC), the High-Capacity (SDHC), the eXtended-Capacity (SDXC), the Ultra-Capacity (SDUC) and the SDIO, which combines input/output functions with data storage. The three form factors are the original size, the mini size, and the micro size. Herein the term "Secure Digital operational mode' refers to protocols for interacting with Secure Digital devices prior to the introduction of the NVMe operational mode in newer devices. The NVMe protocol/NVMe operational mode is a communications standard/protocol developed specially for Secure Storage Devices by a consortium of vendors including Intel, Samsung, SanDisk, Dell, and Seagate. It operates across the PCIe bus (hence the 'Express' in the name), which allows the drives to act more like the fast semiconductor non-volatile memory that they primarily are, rather than the hard disks they imitate.

Memory devices supporting the Secure Digital operational mode are required to support lock and unlock operations for restricting or allowing user-mode access to data stored by the memory device. A host device the interfaces with a solid state drive may lock the memory device using a password and later unlock the memory device using the same password.

SDExpress is a newer standard for memory devices. SDExpress memory devices support both the Secure Digital protocol and non-volatile memory express (NVMe) protocol. Only one protocol is selected as the operational protocol of such memory devices at any given time, with the selection made during a power-on-reset (booting) of the memory device. A host device will be denied access to stored data in user-mode memory blocks of the memory device when the SDExpress memory device is booted in NVMe operational mode, but was previously locked while in Secure Digital operational mode. The term 'user-mode' refers to an operational mode in which an authorized user of a Secure Digital memory device (typically a person or application interacting with the device via a host device) may read and/or write data to (non-hidden or 'user-mode memory blocks' of the device, depending on permissions.

FIG. 1 illustrates such a process 100 for a solid state drive 112. The solid state drive 112 is first booted in the Secure Digital operational mode 102 and then locked (SSD lock 104). Optionally, the SSD lock 104 may involve physically detaching the solid state drive 112 from a host device, e.g., unplugging or ejecting the solid state drive 112 (remove and reconnect SSD 106). However, it is not necessary in all implementations to remove and reconnect a solid state drive in order to lock the device. Next, the solid state drive 112 is booted in the NVMe operational mode 108. At this point, because the solid state drive 112 was previously locked in the Secure Digital operational mode 102, data read and write commands to the solid state drive 112 will fail (read/write failure 110).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
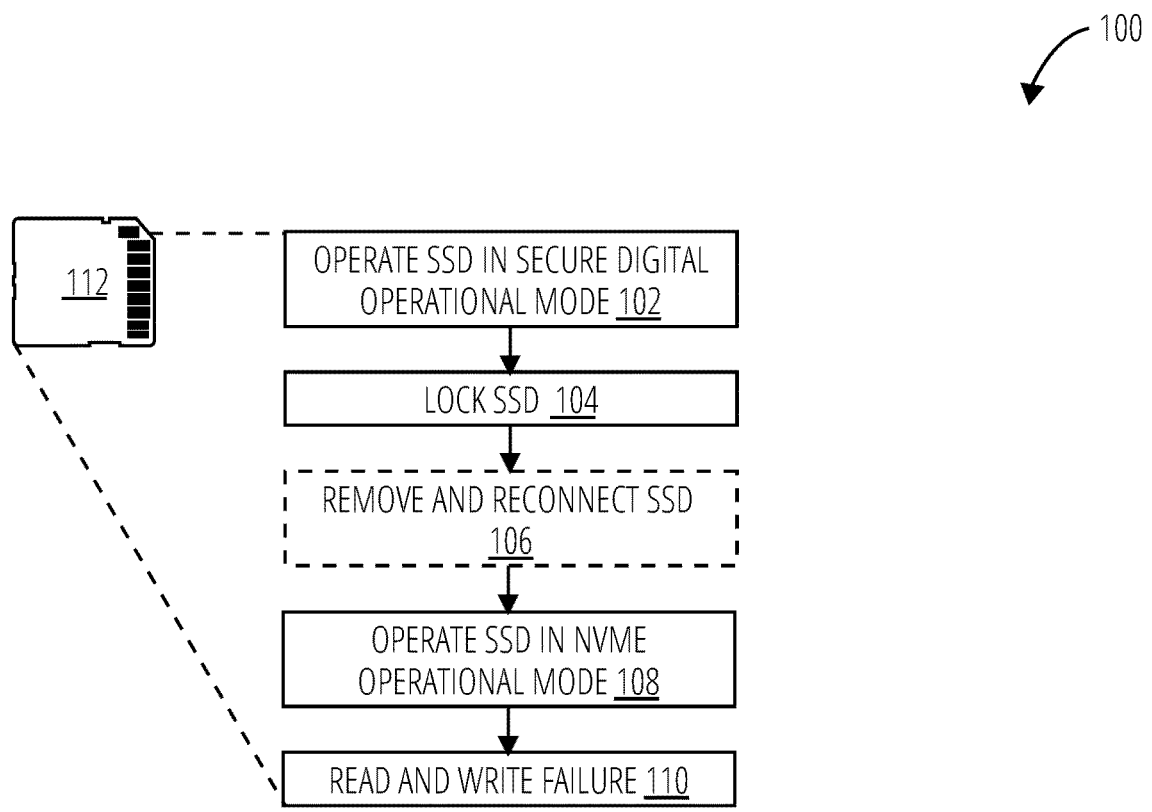
FIG. 1 illustrates a process 100 that causes a read/write failure in a conventional solid state drive.

Described herein are mechanisms to unlock a memory device that boots in the NVMe operational mode that was previously locked in the Secure Digital operational mode. Backward compatibility is maintained with exclusively Secure Digital-mode host devices (e.g., Secure Digital memory devices that don't support the NVMe operational mode). Host devices and end users may utilize these mechanisms with exclusively Secure Digital-mode host devices as well as with newer SDExpress memory devices.

The ATA security protocol is a set of security features and protocols used by Serial ATA or SATA-compliant devices. SATA is a computer bus interface that connects host bus adapters to mass storage devices such as solid state drives, hard disk drives, optical drives, and solid-state drives. SATA host adapters and devices communicate via a high-speed serial cable over two pairs of conductors.

The mechanisms utilize the ATA security features over the NVMe protocol to unlock the memory device when an SDExpress memory device is booted in NVMe operational mode. The host device utilizes the ATA security feature using the same password that it uses for Secure Digital operational mode. The memory device includes Secure Digital mode password to ATA security feature password conversion logic that enables transitions from Secure Digital operational mode to NVMe operational mode without host device involvement. The memory device also includes password blocks in non-volatile memory that can only be accessed by data security logic.

When the SDExpress memory device locks the solid state drive using a password in Secure Digital operational mode, the password length, password and lock status are saved in a security password block in NAND flash memory. The security password block is located in non-user-mode memory blocks and is not available for storing user-mode data.

The NVMe protocol supports multiple security protocols using secure data read and write commands. The ATA security protocol may be one such protocol supported by the NVMe protocol. The ATA security protocol supports both user passwords and master passwords. In one embodiment, password conversion logic converts a Secure Digital security data structure to an ATA security protocol user password. The password conversion logic is triggered during the NVMe operational mode initialization during booting of the SDExpress memory device. The password conversion logic transforms the password by appending zeros to it if the password length in Secure Digital operational mode is less than 32 bytes. The password conversion logic reads the Secure Digital mode password details from Secure Digital mode secure data structure, performs the password conversion, and stores the result in the ATA mode secure data structure. Both the Secure Digital mode secure data structure and ATA mode secure data structure are located in non-user-mode memory blocks of non-volatile memory that are hidden during user-mode use of the solid state drive. When the host device, after NVMe operational mode initialization, sends the ATA unlock command to unlock the memory device, the ATA security protocol handler in the memory device reads the saved password from the ATA mode secure data structure and compares it to the password provided from the host device. If the passwords match, the memory device is set to unlocked mode and data read and write commands to user-mode memory blocks will be successful.

Figure 2:
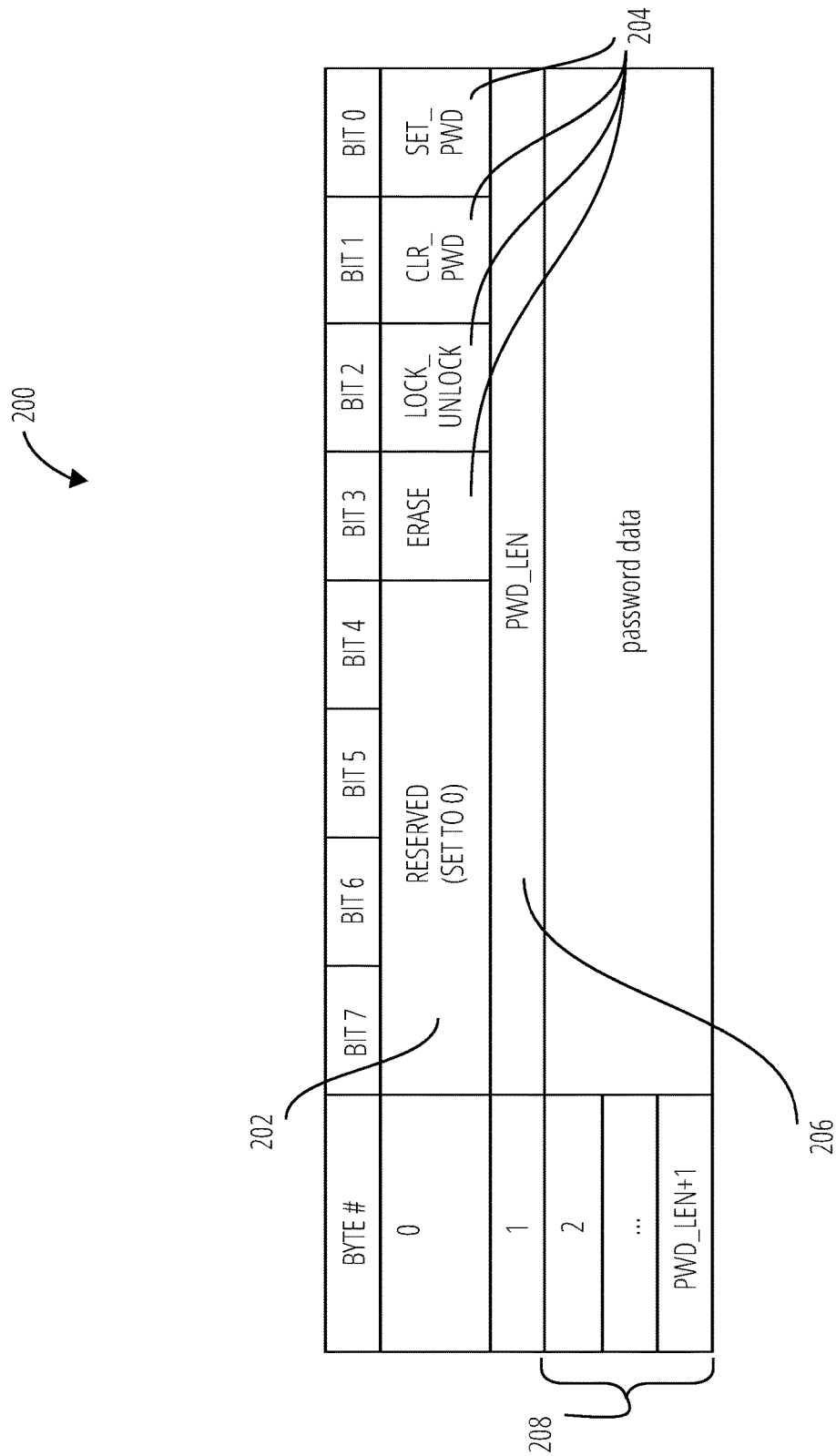
FIG. 2 illustrates a security data structure 200 in accordance with one embodiment.

Referring to FIG. 2, a security data structure 200 comprises reserved bits 202, permission bits 204, a password length byte 206, and a password bytes 208.

The reserved bits 202 and the permission bits 204, together, may comprise the first byte ("byte 0") of the Secure Digital security data structure. The reserved bits 202 are a Secure Digital security data structure standard. These four bits may be set to "0". The permission bits 204 may include operations to erase the security data structure, lock and/or unlock the security data structure, clear the password from the password bytes 208, and set the password to the password bytes 208. The state of the lock/unlock feature of the permission bits 204 may be utilized to determine whether a password is to be utilized when the solid state drive interacts with a host device.

The password length byte 206 comprises bits to represent the password length. The password length byte 206 may comprise the second byte ("byte 1") of the security data structure 200. The password length determines the number of password bytes 208. The password length may be an integer number less than or equal to 32. The password length byte 206 may be utilized to determine whether password conversion logic is to be performed on the Secure Digital mode password.

The password bytes 208 includes a number of bytes equal to the password length comprised in the password length byte 206. The password bytes 208 comprise the password data. The password data may be utilized to set the Secure Digital memory device into an unlocked state from the locked state.

Figure 3:
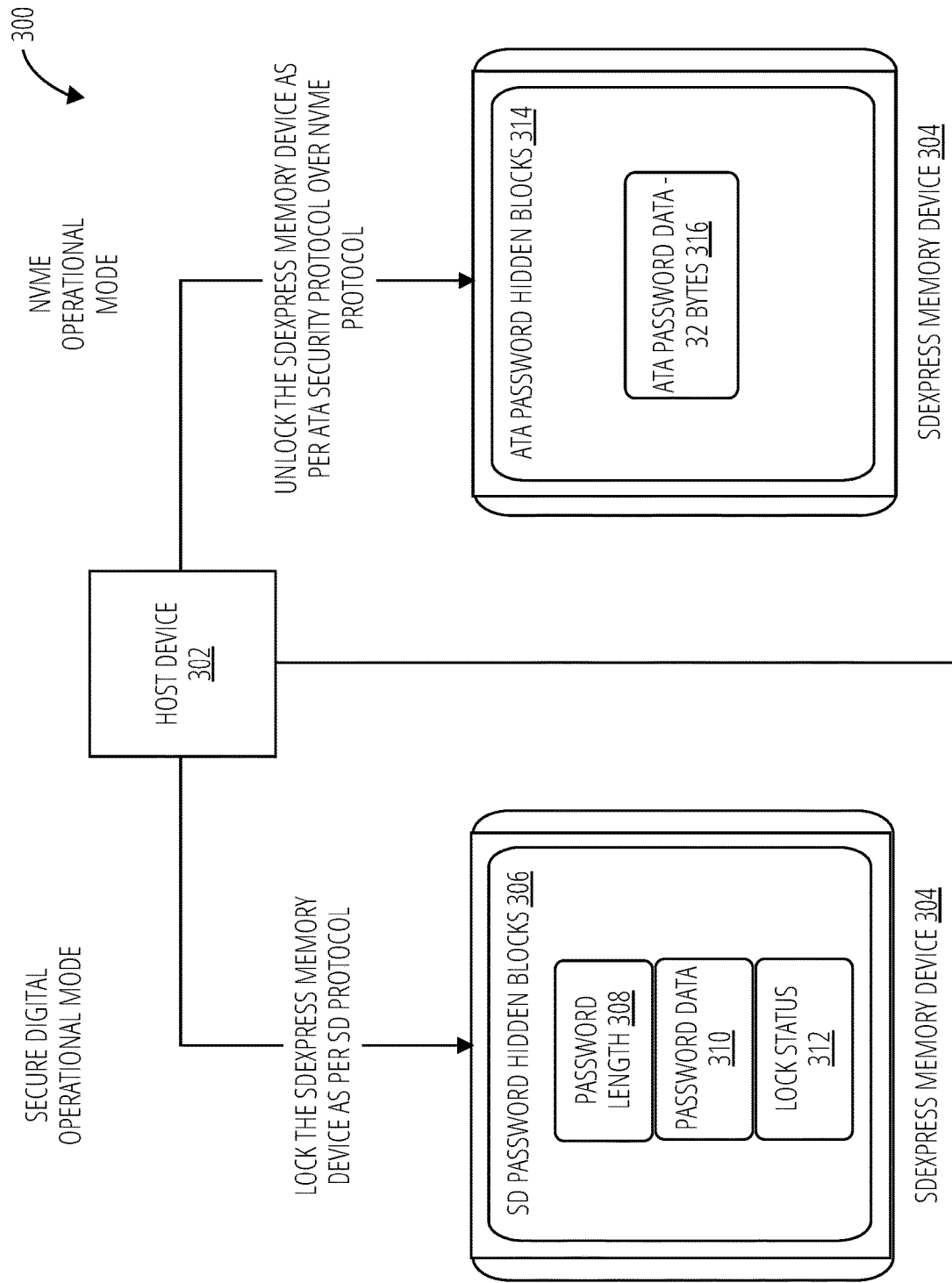
FIG. 3 illustrates an operating process 300 in accordance with one embodiment.

FIG. 3 illustrates an embodiment of an operating process 300 between a host device 302 and an SDExpress memory device 304. The SDExpress memory device 304 includes SD password hidden blocks 306 and ATA password hidden blocks 314. The SD password hidden blocks 306 comprise a password length 308, password data 310, and a lock status 312. The ATA password hidden blocks 314 comprise ATA password data 316.

The host device 302 is a device capable of interfacing with the SDExpress memory device 304. The host device 302 may be a personal computer, an embedded computer (such as in an automobile, autonomous vehicle, etc.), a digital camera, a camcorder, a video game console, a mobile phone, etc. The host device 302 may access the SDExpress memory device 304 in a Secure Digital operational mode or an NVMe operational mode. Multiple host devices may access the SDExpress memory device 304. Each host device 302 may utilize the Secure Digital operational mode, the NVMe operational mode, or both at different times. The host device 302 may also utilize other modes as well. For example, a first host device may access the SDExpress memory device 304 utilizing the Secure Digital operational mode. The first host device may then lock the SDExpress memory device as per Secure Digital protocol. The SDExpress memory device 304 may then be removed from the first host device and connected to a second host device. The second host device may then attempt to unlock the SDExpress memory device 304 as per an ATA security protocol over NVMe protocol. In other words, one or more host device (the same one, or different ones) may attempt to unlock the SDExpress memory device 304 utilizing the NVMe operational mode after locking the SDExpress memory device 304 utilizing the Secure Digital protocol.

The SDExpress memory device 304 may comprise data storage blocks and hidden blocks, such as the SD password hidden blocks 306 and the ATA password hidden blocks 314. The SD password hidden blocks 306 and the ATA password hidden blocks 314 may be located in the same memory block(s) or in different memory blocks of the SDExpress memory device 304. The location of the SD password hidden blocks 306 and the ATA password hidden blocks 314 may be stored in a memory map on the SDExpress memory device 304 to access these hidden blocks. As the SD password hidden blocks 306 and the ATA password hidden blocks 314 are hidden block, they may be outside the user-mode memory blocks. The SD password hidden blocks 306 and the ATA password hidden blocks 314 may be utilized to lock or unlock access to the user-mode memory blocks. When the host device 302 attempts to access the SDExpress memory device 304 utilizing the NVMe operational mode and the SDExpress memory device 304 is locked by the Secure Digital protocol, the SDExpress memory device 304 may undergo an initialization phase. This initialization phase utilizes password conversion logic to convert the password data 310 into the ATA password data 316. The initialization phase may end when the SDExpress memory device 304 indicates to the host device 302 that the SDExpress memory device 304 is ready to utilize the user-mode memory blocks.

The SD password hidden blocks 306 comprise the password length 308, the password data 310, and the lock status 312. The password length 308 is an indication of the number of bytes of the password data 310. The password length 308 may be utilized to determine the conversion of the (Secure Digital operational mode) password data 310 to the ATA password data 316.

The password data 310 is a set of bytes, the Secure Digital mode password, utilized to unlock and lock the SDExpress memory device 304 in the Secure Digital operational mode. During the initialization phase (e.g., booting phase) of the NVMe operational mode, when the host device 302 accesses the SDExpress memory device 304, the password data 310 may be converted to the ATA password data 316 utilizing the password conversion logic. The lock status 312 determines whether the SDExpress memory device 304 is locked or unlock by the Secure Digital operational mode. The lock status 312 may be bit in the permission bits of the SDExpress memory device 304. The permission bits may be located in the SD password hidden blocks 306. If the SDExpress memory device 304 is unlocked, the SDExpress memory device 304 may not utilize the password conversion logic. If the SDExpress memory device 304 is locked, the SDExpress memory device 304 may utilize the password conversion logic when the host device 302 attempts to access the SDExpress memory device 304 utilizing the NVMe operational mode.

In other embodiments, the password conversion logic (shown later, see FIG. 11) may be initiated to transform the Secure Digital mode password password data 310 to the ATA password data 316 when the SDExpress memory device 304 is locked in the Secure Digital operational mode, and the transformed ATA security protocol password may be stored at this time in the ATA password hidden blocks 314.

The ATA password hidden blocks 314 comprise the ATA password data 316. The ATA password data 316 is a set of bytes, the NVMe operational mode password, utilized to provide access to the SDExpress memory device 304 user-mode memory blocks in the NVMe operational mode. When the SDExpress memory device 304 was previously locked in the Secure Digital operational mode, the ATA password data 316 may be a transformation of the password data 310 (i.e., the Secure Digital mode password) carried out by the password conversion logic.

Figure 4:
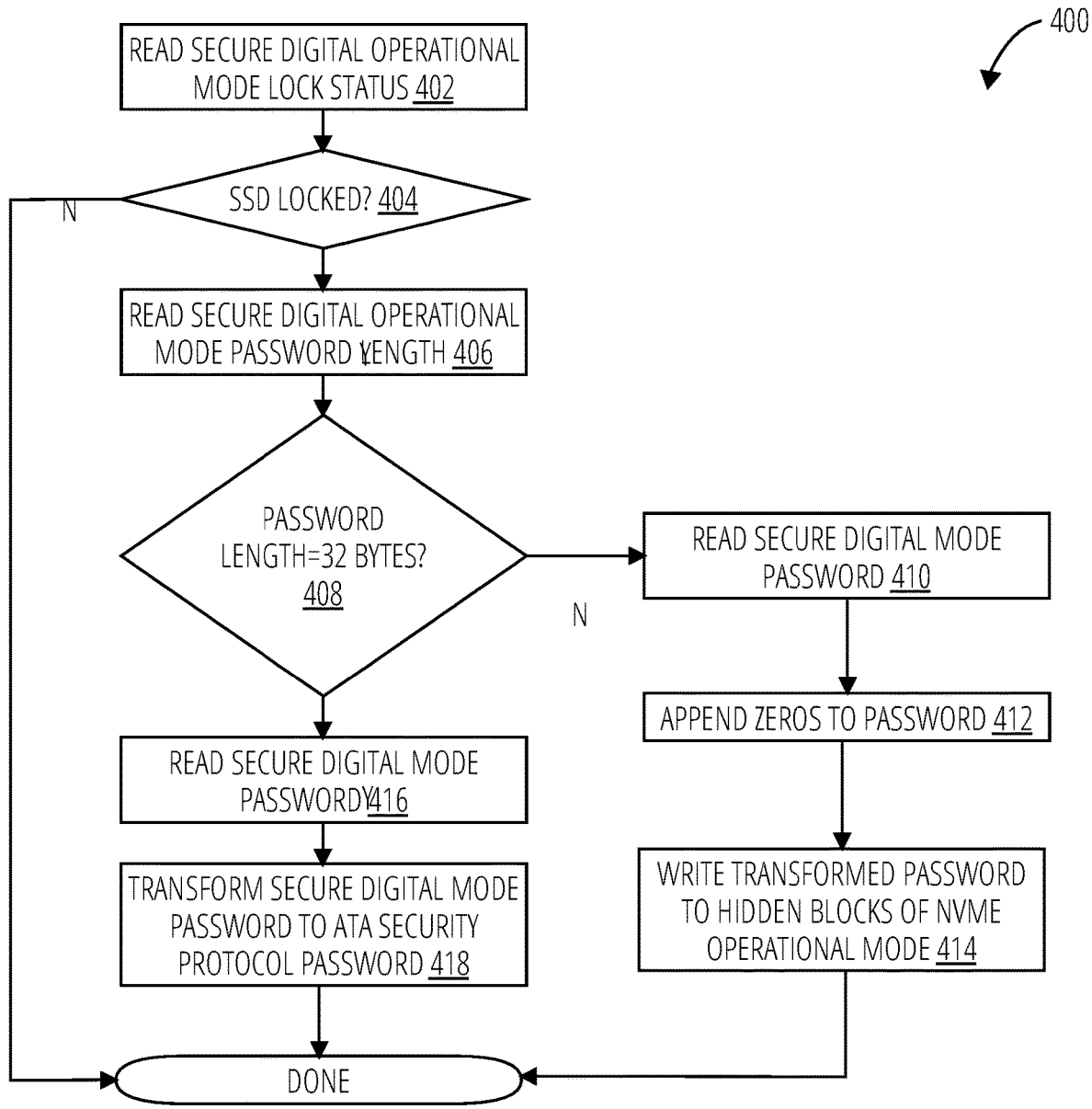
FIG. 4 illustrates an operating process 400 in accordance with one embodiment.

FIG. 4 illustrates an embodiment of an operating process 400 responsive to a host device attempting to access the SDExpress memory device utilizing an NVMe operational mode. The Secure Digital operational mode lock status is read (block 402). The Secure Digital security data structure may store the lock status in a permission bit, and may be located in a Secure Digital mode password hidden block. The lock status may be locked or unlocked. The operating process 400 then determines whether the SDExpress memory device is locked (decision block 404). If the SDExpress memory device is unlocked, the operating process 400 ends (e.g., by entering a user-mode).

If (on condition that) the SDExpress memory device is locked, the Secure Digital operational mode password length is read (block 406). The Secure Digital security data structure may store the password length and be located in the Secure Digital mode password hidden block(s). The password length may be an integer number of bytes that is less than or equal to 32. The operating process 400 determines if the password length is equal to 32 bytes (decision block 408).

If (on condition that) the password length is not 32 bytes, the Secure Digital mode password is read (block 410). The Secure Digital mode password may be stored in the Secure Digital mode password hidden blocks of the Secure Digital security data structure as the password data. The password length may determine the number of bytes read by the SDExpress memory device. Zeros are then appended to the password (block 412). The number of zeros appended is based on the password length. Particularly, the number of zeros appended is the difference between 32 and the password length. For example, if the password length is 8 bytes, then 24 zeros are appended to the password. The transformed password is then written to hidden blocks of NVMe operational mode (block 414). These hidden blocks are accessible via the ATA security protocol in NVMe operational mode. An NVMe operational mode-compatible password is thus stored in the ATA password hidden blocks (this may be referred to herein as the ATA security protocol password). The operating process 400 then ends (e.g., followed by authentication with the password and entry into user-mode).

If (on condition that) the password length is equal to 32 bytes, the Secure Digital mode password is read (block 416). The Secure Digital mode password may be stored in the Secure Digital mode password hidden blocks of the Secure Digital security data structure as the password data. The password length may determine the number of bytes read by the SDExpress memory device. The Secure Digital mode password is then transformed to the ATA security protocol password (block 418). The NVMe operational mode password is written to the ATA password hidden blocks and stored as the ATA security protocol password. The operating process 400 then ends.

In some embodiments, once the operating process 400 ends, the SDExpress memory device sends a control signal to the host device. The control signal may provide access to the SDExpress memory device or may request a password credential, which may then be compared to the stored ATA security protocol password (e.g., user authentication for entry into user-mode).

Figure 5:
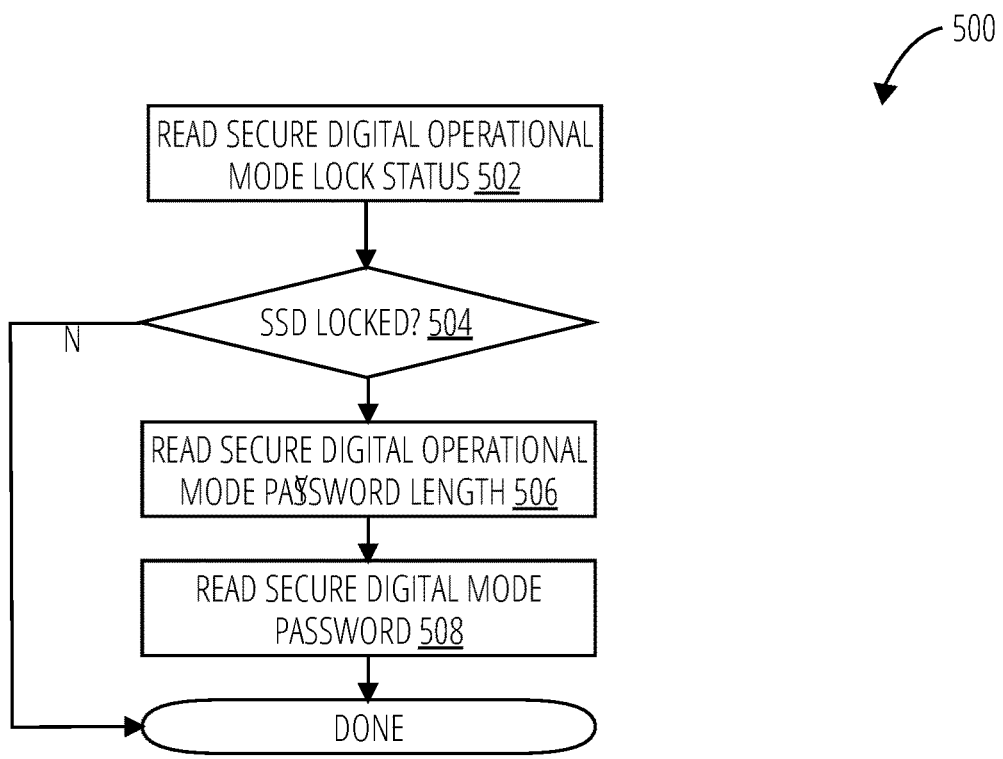
FIG. 5 illustrates an operating process 500 in accordance with one embodiment.

Referring to FIG. 5, an operating process 500 in one embodiment operates in response to a host device attempting to access the SDExpress memory device utilizing a Secure Digital operational mode. A Secure Digital operational mode lock status is read (block 502). The Secure Digital security data structure may store the lock status in a permission bit and be located in a Secure Digital mode password hidden block. The lock status may be locked or unlocked. The operating process 500 then determines whether the SDExpress memory device is locked (decision block 504). If the SDExpress memory device is unlocked, the operating process 500 ends.

If the SDExpress memory device is locked, the Secure Digital operational mode password length is read (block 506). The Secure Digital security data structure may store the password length and be located in the Secure Digital mode password hidden block. The password length may be an integer number of bytes that is less than or equal to 32. The Secure Digital mode password is read (block 508). The Secure Digital mode password may be stored in the SD password hidden blocks of the Secure Digital security data structure as the password data. The password length may determine the number of bytes read by the SDExpress memory device. The operating process 500 then ends.

In some embodiments, once the operating process 500 ends, the SDExpress memory device sends a control signal to the host device. The control signal may provide access to the SDExpress memory device or may request a password credential, which may then be compared to the stored Secure Digital mode password.

Content Protection for Recordable Media (CPRM) is a method of copyright protection used by Secure Digital memory devices. The CPRM specification provides encryption and replay protection to the content stored in a user area of a Secure Digital operational mode card.

As previously described the newer SDExpress memory devices support both Secure Digital protocol and NVMe protocol. Only one protocol may be utilized at a time. This creates the problem of denial of access to encrypted content stored using CPRM in Secure Digital operational mode when the device is subsequently booted in NVMe operational mode. The problem is illustrated in FIG. 7.

Figure 6:
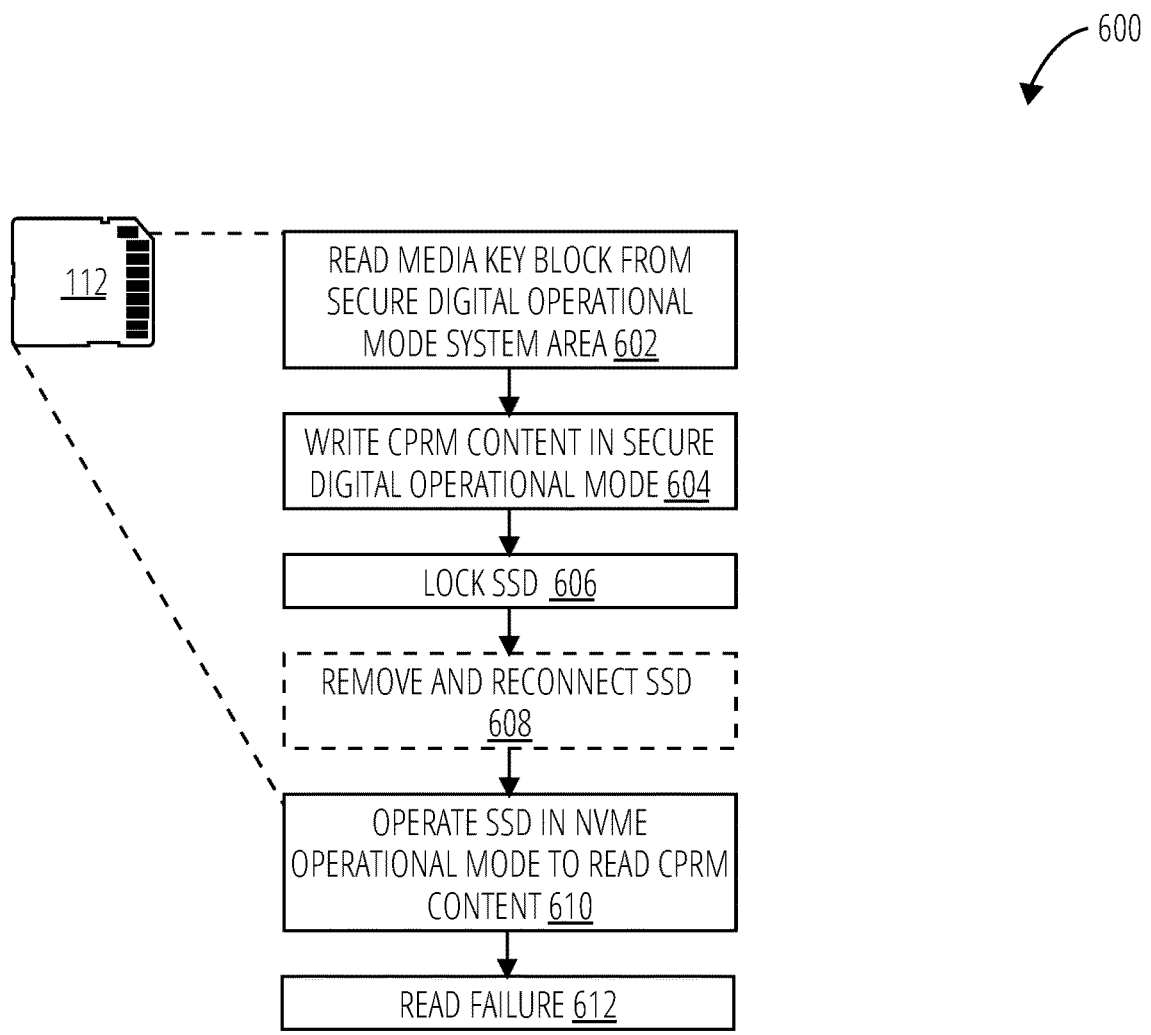
FIG. 6 illustrates a conventional CPRM read and write process 600 that causes a read/write failure in a conventional solid state drive.

FIG. 6 illustrates a conventional CPRM read and write process 600. In the Secure Digital operational mode, the solid state drive 112 reads a media key from the system area at block 602 and writes the CPRM content in the user area at block 604. The solid state drive 112 is locked (block 606) and/or removed from the host device (block 608) and re-booted in the NVMe operational mode at block 610, at which time a read failure occurs if the solid state drive 112 tries to read the media content from the user area (block 612).

Figure 7:
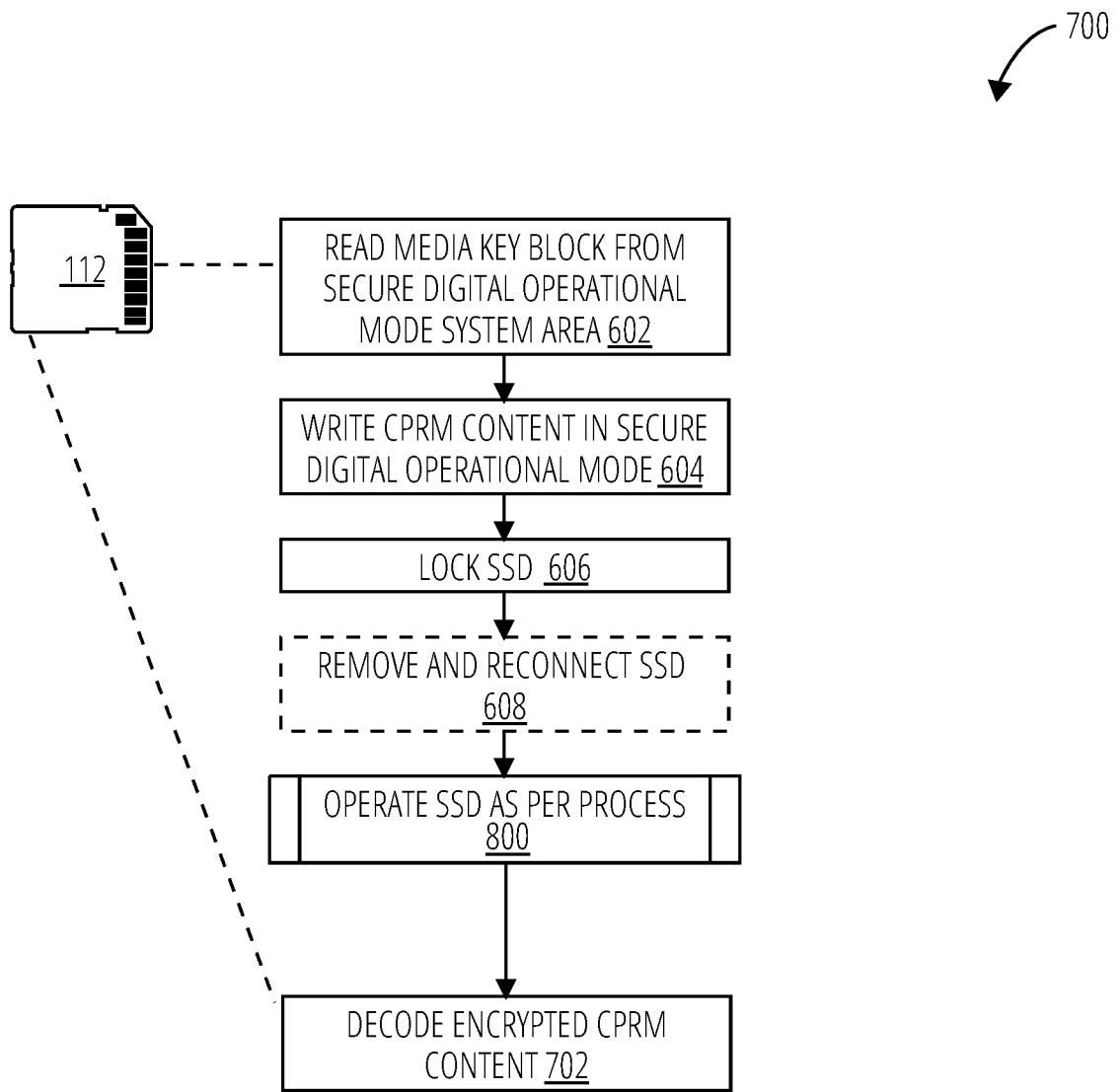
FIG. 7 illustrates a CPRM data write and data read process 700 in accordance with one embodiment.

FIG. 7 illustrates an enhanced CPRM data write and data read process 700 in one embodiment. Using the CPRM data write and data read process 700 the solid state drive 112 reads a media key from the system area at block 602, writes the CPRM content in the user area at block 604, is locked (block 606) and/or is removed from the host device (block 608), as before for the conventional CPRM read and write process 600. However now the solid state drive 112 operates as per the CPRM data write and data read process 800 of FIG. 8, and is able to decode the encrypted CPRM content at block 702.

Figure 8:
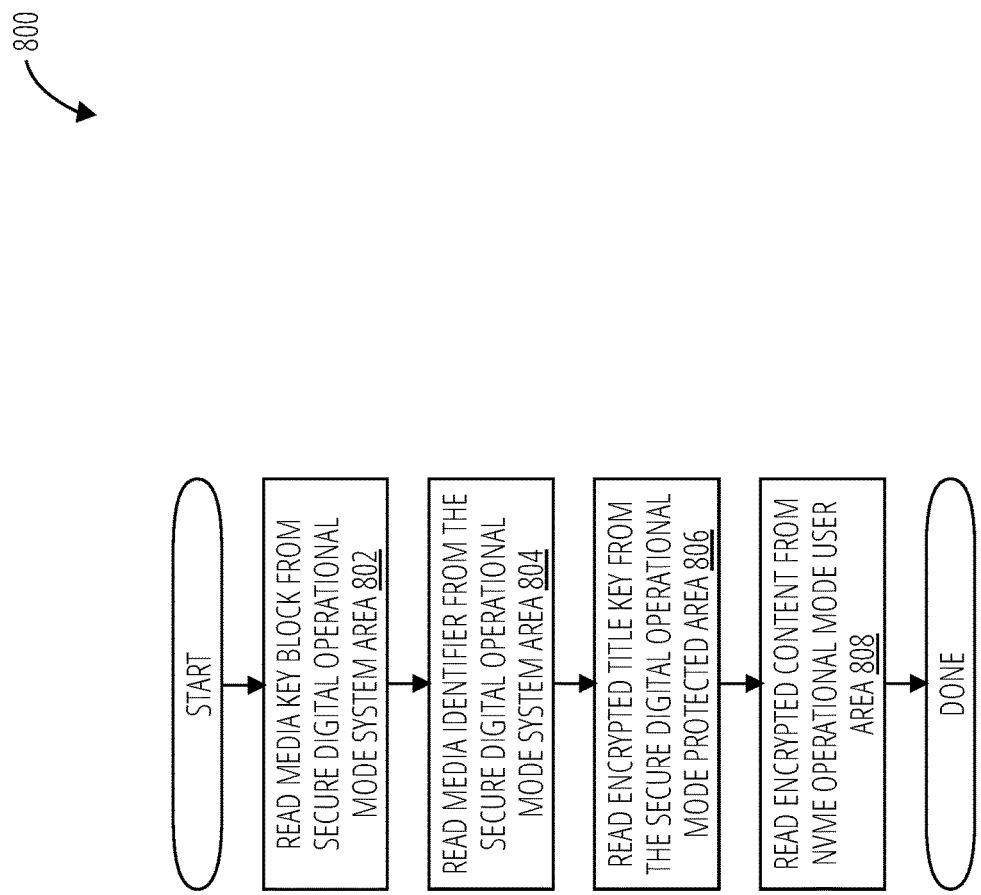
FIG. 8 illustrates a CPRM data write and data read process 800 in accordance with one embodiment.

Referring now to FIG. 8, a CPRM data write and data read process 800 embodiment in overview reads the media key from the Secure Digital operational mode system area at block 802, reads the media identifier from the Secure Digital operational mode system area at block 804, reads the encrypted title key from the Secure Digital operational mode protected area at block 806, and reads the encrypted content from the NVMe operational mode user area at block 808.

Figure 9:
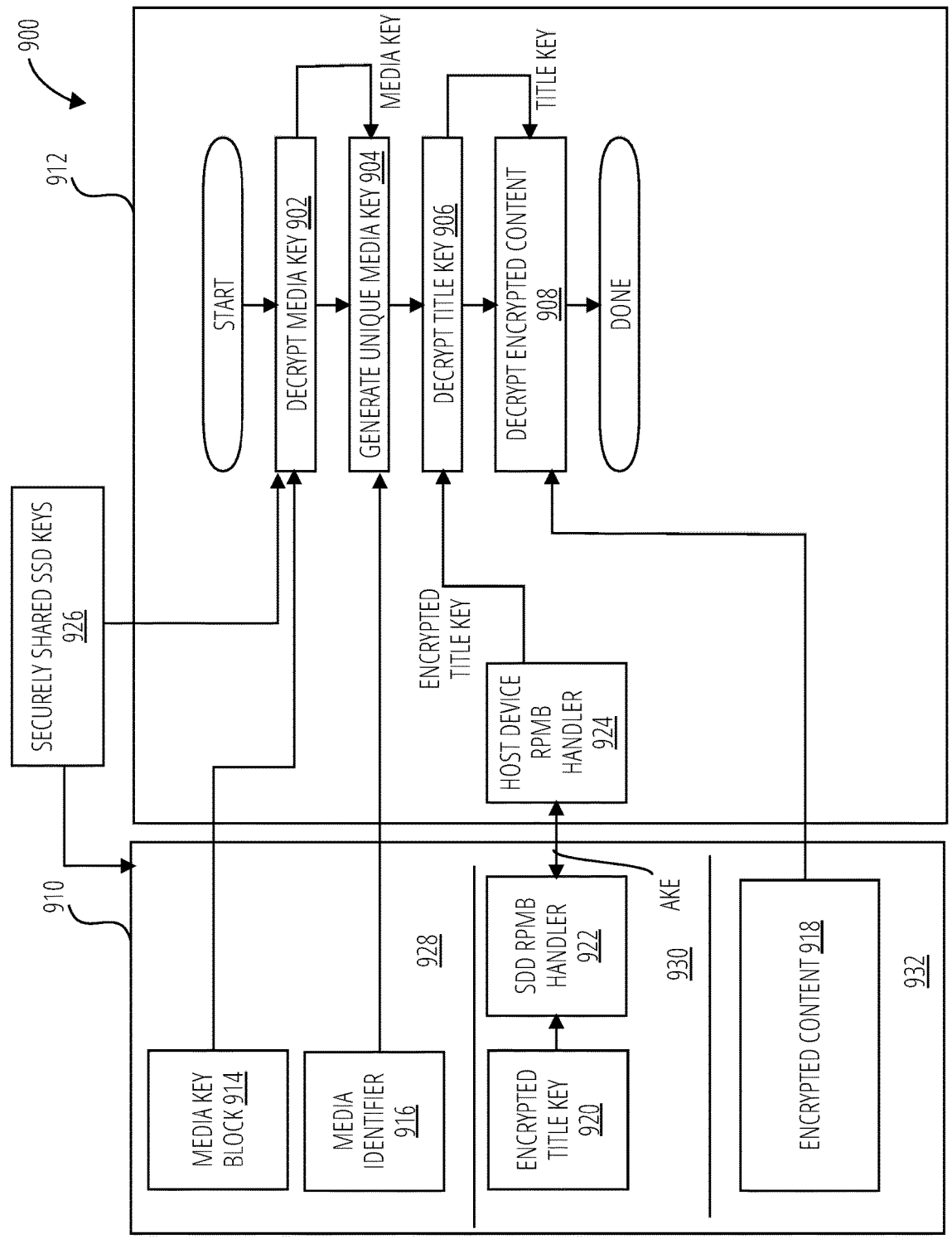
FIG. 9 illustrates a CPRM content READ logic in Secure Digital operational mode 900 in accordance with one embodiment.
Figure 10:
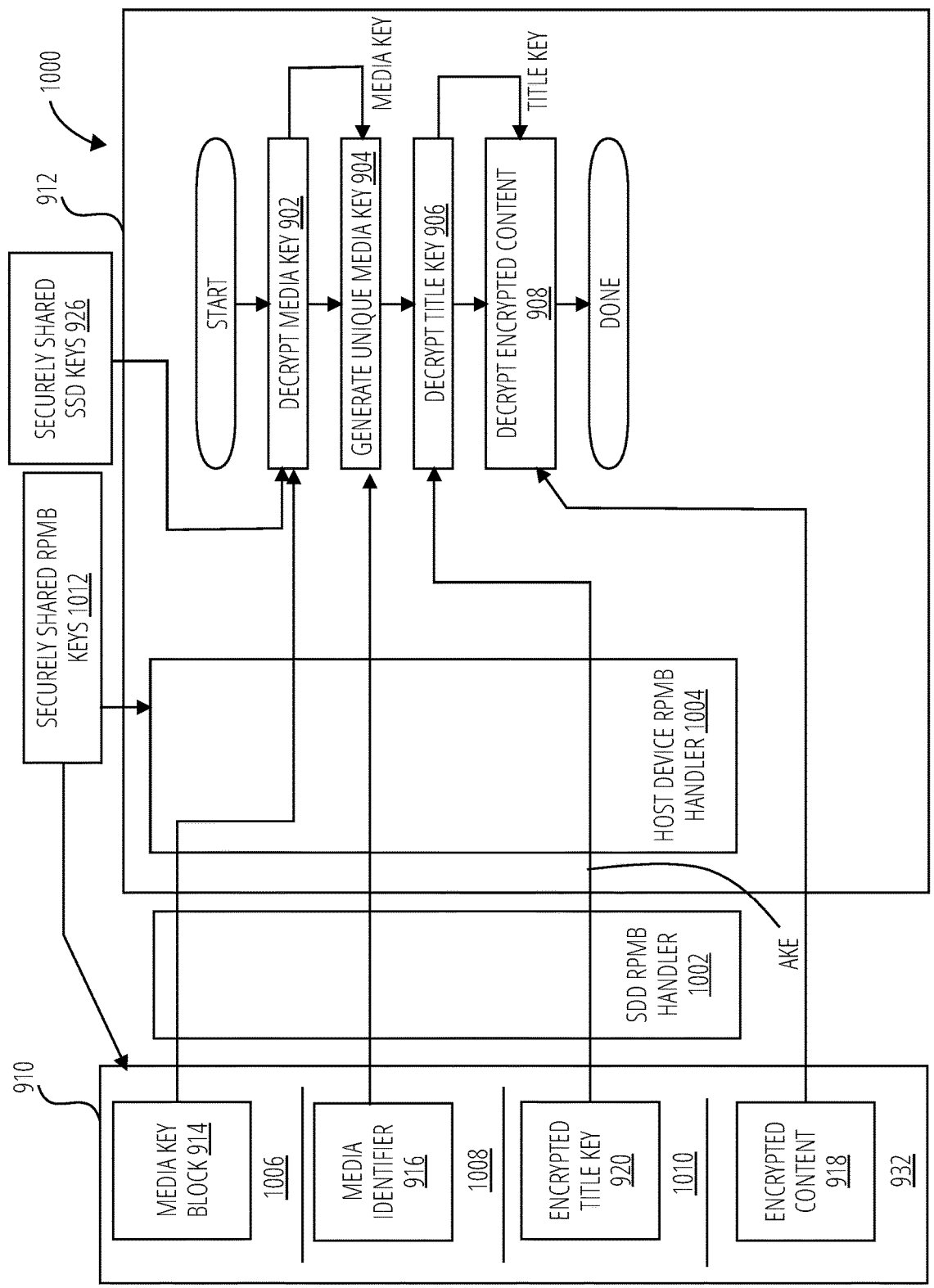
FIG. 10 illustrates a CPRM data read logic in NVMe operational mode 1000 in accordance with one embodiment.

The CPRM data write and data read process 700 and the CPRM data write and data read process 800 may be better understood in the context of FIG. 9 and FIG. 10.

The media key block 914 and the media identifier 916 are stored in the Secure Digital operational mode system memory area 928 of the Secure Digital memory device 910. The CPRM content READ logic in Secure Digital operational mode 900 uses securely shared SSD keys 926, which along with the media key block 914 and media identifier 916, are used by the host device 912 to decrypt the media key (block 902) and create the media unique key (block 904). The encryption and decryption processes utilizing these keys are described in detail in the CPRM specification and will not be repeated here. The encrypted title key 920 is obtained from the Secure Digital operational mode protected memory area 930 using secure authentication and key exchange (AKE) by the SDD RPMB handler 922 and host device RPMB handler 924. The generated media unique key is used to decrypt the encrypted title key 920 (block 906), and the decrypted title key is then used to decrypt the encrypted content 918 (block 908) which is stored in the Secure Digital operational mode user memory area 932. Authentication and key exchange are used to read or write to the protected area, using a session key. The authentication and key exchange ensures replay protection for the encrypted title key 920 stored in the protected memory area 930.

In yet more detail, the following interactions may take place between a Secure Digital memory device and a host device to READ encrypted content 918 stored in the user memory area 932 of a Secure Digital device:

1. The media key block 914 is READ from the system memory area 928 using the ACMD43 Secure Digital operational mode command.

2. The media identifier 916 is READ from the system memory area 928 using the ACMD44 Secure Digital operational mode command.

3. The encrypted title key 920 is READ from the protected memory area 930 through authentication and key exchange using Secure Digital operational mode commands for authentication, key exchange, and secure READ.

4. The encrypted content 918 is READ from the user memory area 932 using Secure Digital operational mode user area READ commands.

The CPRM data read logic in NVMe operational mode 1000 of FIG. 10 illustrates how the replay-protected memory block (RPMB) features of the NVMe protocol may be exploited to READ the CPRM encrypted content 918 stored in the user memory area 932 in Secure Digital operational mode. Secure Digital operational mode CRPM content by an SDExpress memory device booted in the NVMe operational mode.

The Secure Digital operational mode CPRM content READ process is replaced, in the NVMe operational mode, by a replay-protected memory block process. The media key block 914, media identifier 916, and encrypted title key 920 are stored in separate replay-protected memory block partitions of the Secure Digital memory device 910, and are accessible only to a CPRM-replay-protected memory block handler (SDD RPMB handler 1002) of the Secure Digital memory device 910. A similar handler (host device RPMB handler 1004) is deployed in the host device 912. A full specification of the use of replay-protected memory blocks in the NVMe operational mode is available in the corresponding public specification and will not be repeated here.

As shown in FIG. 10, the replay-protected memory block feature of devices operated in the NVMe operational mode may be utilized to facilitate decryption of CPRM content previously stored during the Secure Digital operational mode. In the NVMe operational mode, the SDD RPMB handler 1002 provides logical mapping of Secure Digital operational mode CPRM transactions to the replay-protected memory blocks RPMB Target 1 block 1006, RPMB Target 2 block 1008, and RPMB Target 3 block 1010. These replay-protected memory blocks provide authentication and replay protection for the media key block 914, media identifier 916, and encrypted title key 920. The authentication and key exchange feature of Secure Digital operational mode CPRM is provided in the NVMe operational mode by the replay-protected memory block, using a signature check such as HMAC-SHA256.

The replay-protected memory block authentication keys (securely shared RPMB keys 1012) may be provisioned to the Secure Digital memory device 910 and/or host device 912 in ways known in the art, such as being programmed into the Secure Digital memory device 910 and/or host device 912 in a secured manufacturing environment through mutual agreement. The securely shared RPMB keys 1012 may be provided along with the CPRM securely shared SSD keys 926.

The replay-protected memory block is in one embodiment a reserved data area in NAND (FLASH memory) storage of the host device 912. The replay-protected memory block is mapped to a Secure Digital operational mode CPRM-specific memory storage area. The location of these areas is known to the SDD RPMB handler 1002 of the Secure Digital memory device 910 and the host device RPMB handler 1004 of the host device 912, and directly accessible only by the SDD RPMB handler 1002.

1. The SDD RPMB handler 1002 maps the RPMB Target 1 block 1006 to the system memory area 928 that stores the media key block 914 in Secure Digital operational mode.

2. The SDD RPMB handler 1002 maps the RPMB Target 2 block 1008 to the system memory area 928 that stores the media identifier 916 in Secure Digital operational mode.

3. The SDD RPMB handler 1002 maps the RPMB Target 3 block 1010 to the protected memory area 930 that stores the encrypted title key 920 in the Secure Digital operational mode.

Thus, the SDD RPMB handler 1002 maps the media key block 914 READ command in NVMe operational mode to a READ from the RPMB Target 1 block 1006, maps the media identifier 916 READ command in NVMe operational mode to a READ from the RPMB Target 2 block 1008, and maps the encrypted title key 920 READ command in NVMe operational mode to a READ from the RPMB Target 3 block 1010. The location of these target blocks may be concealed by the SDD RPMB handler 1002.

Thus the following transactions are utilized in NVMe operational mode to retrieve the encrypted CPRM content:

The SDD RPMB handler 1002 provides the memory mapping and command conversion logic described above. The host device RPMB handler 1004 utilizes the CPRM command logic that is standard on Secure Digital memory devices. The host device RPMB handler 1004 interacts with the SDD RPMB handler 1002 and does not interact directly with the replay-protected memory blocks.

Utilizing these mechanisms enables a host device utilizing an SDExpress memory device to read CPRM content in the NVMe operational mode when that content was encrypted in the Secure Digital operational mode, without any changes to legacy SDExpress specifications. An older host device that does not the NVMe operational mode may be used to record the CPRM content in the Secure Digital operational mode, and a different host device that supports the NVMe operational mode may be utilized to play back the recorded content, which may achieve performance advantages due to the superior performance of NVMe operational mode for high bandwidth data transfers.

Figure 11:
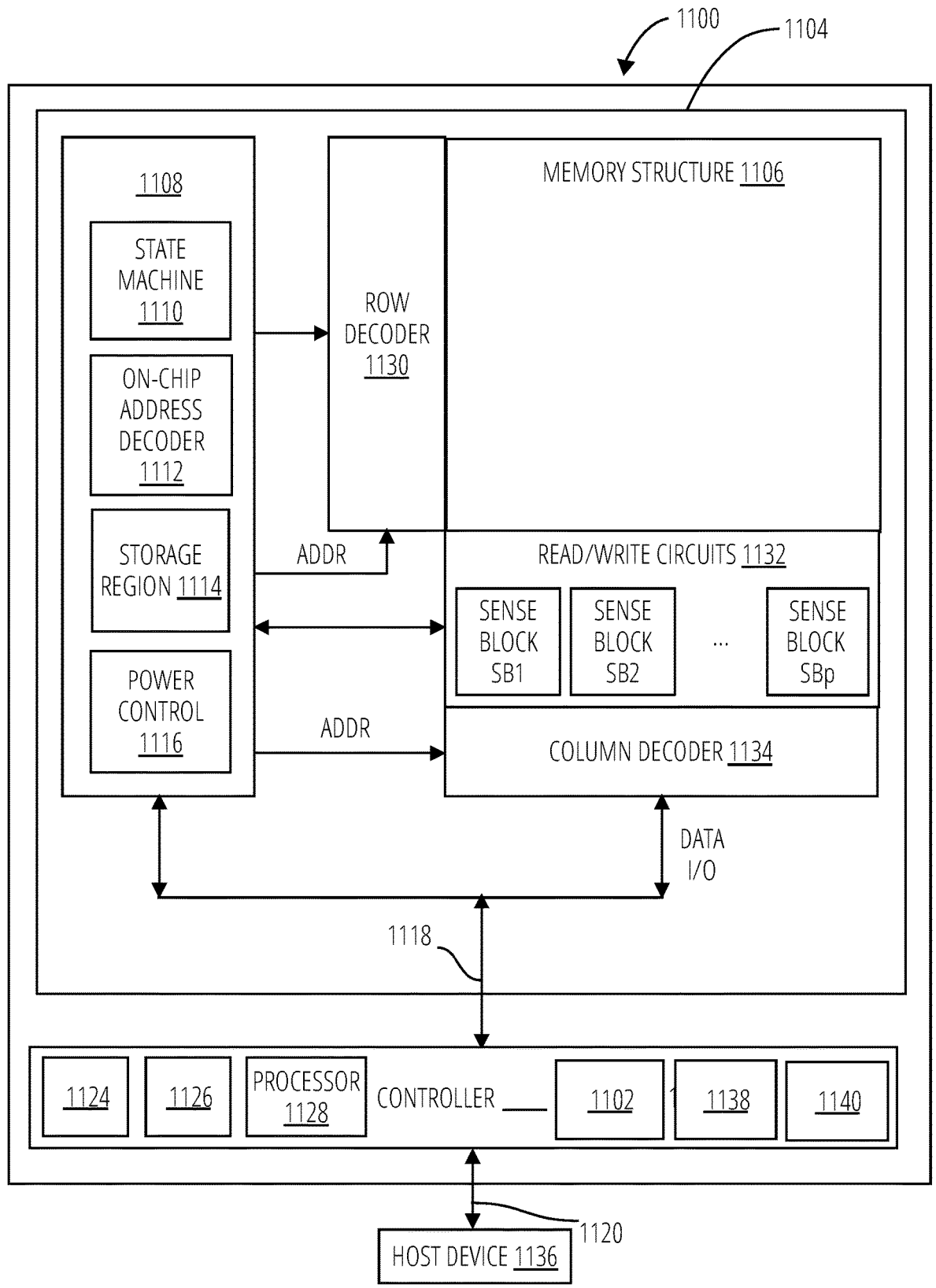
FIG. 11 is a block diagram of an example memory device 1100.

FIG. 11 is a block diagram of an exemplary memory device 1100, which may be a Secure Digital memory device. The memory device 1100 may include one or more memory die 1104. The memory die 1104 includes a memory structure 1106 of memory cells, such as an array of memory cells herein referred to as a memory array, an address controller 1108, and read/write circuits 1132. The memory structure 1106 is addressable by word lines via a row decoder 1130 and by bit lines via a column decoder 1134. The read/write circuits 1132 include multiple sense blocks SB1, SB2, . . . , SBp (sensing circuitry) and allow a page of memory cells to be read or programmed in parallel. Typically a read/write controller 1122 is included in the same memory device 1100 (e.g., a removable memory device) as the one or more memory die 1104. Commands and data are transferred between the host device 1136 and read/write controller 1122 via a data bus 1120, and between the controller and the one or more memory die 1104 via lines 1118.

The memory structure 1106 can be 2D (laid out in a single fabrication plane) or 3D (laid out in multiple fabrication planes). The memory structure 1106 may comprise one or more array of memory cells including a 3D array. In one embodiment, the memory structure 1106 may comprise a monolithic three-dimensional memory structure (3D array) in which multiple memory levels are formed above (and not in) a single substrate, such as a wafer, with no intervening substrates. The memory structure 1106 may comprise any type of non-volatile memory that is monolithically formed in one or more physical levels of arrays of memory cells having an active area disposed above a silicon substrate. The memory structure 1106 may be in a non-volatile memory having circuitry associated with the operation of the memory cells, whether the associated circuitry is above or within the substrate.

The address controller 1108 cooperates with the read/write circuits 1132 to perform memory operations on memory cells of the memory structure 1106, and includes a state machine 1110, an address decoder 1112, a temperature controller 1138, and a power control 1116. The state machine 1110 provides chip-level control of memory operations. A store region selector 1114 may be provided, e.g., for programming parameters as described further below.

The address decoder 1112 provides an address interface between that used by the host device or a read/write controller 1122 to the hardware address used by the row decoder 1130 and column decoder 1134. The power control 1116 controls the power and voltages supplied to the various control lines during memory operations. The power control 1116 and/or read/write circuits 1132 can include drivers for word lines, source gate select (SGS) transistors, drain gate select (DGS) transistors, bit lines, substrates (in 2D memory structures), charge pumps, and source lines. The power control 1116 can therefore include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than memory structure 1106, can be thought of as at least one control circuit or controller which is configured to perform the techniques described herein. For example, a control circuit may include any one of, or a combination of, address controller 1108, state machine 1110, address decoder 1112, column decoder 1134, power control 1116, control processor 1128, error correction unit 1102, sense blocks SB1, SB2, . . . , SBp, read/write circuits 1132, read/write controller 1122, and so forth.

The read/write controller 1122 may comprise a control processor 1128, memory devices (memory) such as controller read-only memory 1124 and controller volatile memory 1126, and other functional units known in the art.

The memory devices of the read/write controller 1122 may comprise code such as a set of instructions, and the control processor 1128 is operable to execute the set of instructions to provide aspects of the functionality described herein, such as the operating process 300, the operating process 400 and the operating process 500. Alternatively or additionally, the control processor 1128 can access code from the memory structure 1106, such as a reserved area of memory cells in one or more word lines.

For example, code can be used by the read/write controller 1122 to access the memory structure 1106 for programming (write), read, and reset operations. The code can include boot code and control code (e.g., set of instructions). The boot code is software that initializes the read/write controller 1122 during a booting or startup process and enables the read/write controller 1122 to access the memory structure 1106. The code can be used by the read/write controller 1122 to control one or more memory structures. In one embodiment, upon being powered up, the control processor 1128 fetches the boot code from the controller read-only memory 1124 or memory structure 1106 for execution, and the boot code initializes the system components and loads the control code into the controller volatile memory 1126. Once the control code is loaded into the controller volatile memory 1126, it is executed by the control processor 1128. The control code includes drivers to perform basic tasks such as controlling and allocating memory, prioritizing the processing of instructions, and controlling input and output ports.

In some embodiments the read/write controller 1122 may configure a password converter 1140 in the memory structure 1106 at a fixed location and size. In other embodiments, for example to implement wear leveling algorithms, the read/write controller 1122 may change the location and/or size of the password converter 1140 in the memory structure 1106. The size or location of the password converter 1140 may be changed for example after a number of programming operations on the memory cells in the password converter 1140, or to comprise areas of the memory structure 1106 having high concentrations of invalid (not marked for retention) data.

Generally, the control code can include instructions to perform the operations described herein and provide the control signals discussed previously. The control code can implement a sequencer to control the timing (start and stop times, durations, spacing etc.) of the various actions described herein.

In one embodiment, the host device 1136 is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the read/write controller 1122 to perform the methods described herein. The host device may also include additional system memory, one or more input/output interfaces and/or one or more input/output devices in communication with the one or more processors, as well as other components well known in the art.

The store region selector 1114 may be a non-volatile memory such as NAND flash memory, or another type, implementing a memory map or address translation table. Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Software" refers to logic implemented as processor-executable instructions in a machine memory (e.g. read/write volatile or nonvolatile memory or media).

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

What is claimed is:

1. A solid state drive comprising:
    a SDExpress memory device comprising:
        one or more Secure Digital mode password hidden blocks; and
        one or more Advanced Technology Attachment (ATA) password hidden blocks; and
    a controller coupled the memory device, the controller comprising:
        password conversion logic configured to convert, during booting of the solid state drive in non-volatile memory express (NVMe) operational mode, a password stored in the Secure Digital mode password hidden blocks to a password stored in the ATA password hidden blocks based on a password length, wherein the converted password enables user-mode memory blocks that were locked in Secure Digital operational mode to be accessed in NVMe operational mode.

2. The solid state drive of claim 1, wherein the Secure Digital mode password hidden blocks are different memory blocks than the ATA password hidden blocks.

3. The solid state drive of claim 1, wherein the password length is an integer number of bytes that is less than or equal to 32.

4. The solid state drive of claim 3, further comprising:
    the password conversion logic further configured to:
        on condition that the password length is not equal to 32 bytes, read a Secure Digital mode password from Secure Digital mode password hidden blocks and append to the Secure Digital mode password a number of zeros equal to a difference between 32 and the password length.

5. The solid state drive of claim 1, further comprising:
    logic to map a system memory area storing a media key block and a media identifier in a Secure Digital operational mode to a first replay-protected memory block and a second replay-protected memory block, respectively, in the NVMe operational mode.

6. The solid state drive of claim 5, further comprising logic to map a protected memory area storing an encrypted title key in the Secure Digital operational mode to a third replay-protected memory block in the NVMe operational mode.

7. A method of operating an SDExpress memory device, the method comprising:
    booting the SDExpress memory device in a Secure Digital operational mode;
    locking the SDExpress memory device in the Secure Digital operational mode
    in response to locking the SDExpress memory device in the Secure Digital operational mode, storing a Secure Digital mode password in a security data structure comprising the Secure Digital mode password and a password length;
    booting the SDExpress memory device in a non-volatile memory express (NVMe) operational mode; and
    transforming the Secure Digital mode password to an NVMe mode password based on the password length.

8. The method of claim 7, further comprising:
    writing the NVMe mode password to Advanced Technology Attachment (ATA) password hidden blocks accessible to the SDExpress memory device in the NVMe operational mode.

9. The method of claim 7, further comprising:
    on condition that the password length is not equal to 32 bytes, reading the Secure Digital mode password from Secure Digital mode password hidden blocks and appending to the Secure Digital mode password a number of zeros equal to a difference between 32 and the password length.

10. The method of claim 7, further comprising:
    on condition that the password length is equal to 32 bytes, transforming the Secure Digital mode password to an Advanced Technology Attachment (ATA) security protocol password and applying the ATA security protocol password to unlock the SDExpress memory device.

11. The method of claim 7, wherein transforming the Secure Digital mode password further comprises:
    reading a lock status for the Secure Digital operational mode from the security data structure located in a Secure Digital mode password hidden block.

12. The method of claim 11, further comprising:
    on condition that the lock status indicates that the SDExpress memory device is locked, reading the password length from the Secure Digital mode password hidden block.

13. The method of claim 7, further comprising:
    the SDExpress memory device mapping system memory areas storing a media key block and a media identifier in the Secure Digital operational mode to a first replay-protected memory block and a second replay-protected memory block, respectively, in the NVMe operational mode.

14. The method of claim 13, the SDExpress memory device further mapping a protected memory area storing an encrypted title key in the Secure Digital operational mode to a third replay-protected memory block in the NVMe operational mode.

15. A solid state drive comprising:
    a SDExpress memory device;
    a host device interface operable in either of a Secure Digital operational mode and a non-volatile memory express (NVMe) operational mode; and
    a controller coupled to the SDExpress memory device, the controller configured to:
        boot the solid state drive in the Secure Digital operational mode;
        in response to locking the solid state drive in the Secure Digital operational mode, storing a Secure Digital mode password in Secure Digital mode password hidden blocks comprising the Secure Digital mode password and a password length;
boot the solid state drive in the NVMe operational mode; and
in response to determining that the solid state drive was locked in the Secure Digital operational mode, transform the Secure Digital mode password to an NVMe mode password based on the password length, wherein the transformed password enables user-mode memory blocks that were locked in Secure Digital operational mode to be accessed in NVMe operational mode.

16. The solid state drive of claim 15, wherein transforming the Secure Digital mode password further comprises:
reading a lock status for the Secure Digital operational mode from a security data structure located in a Secure Digital mode password hidden block.

17. The solid state drive of claim 16, the controller further configured to:
on condition that the lock status indicates that the solid state drive is locked, read the password length from the Secure Digital mode password hidden block.

18. The solid state drive of claim 15, the controller further configured to:
write the NVMe mode password to Advanced Technology Attachment (ATA) password hidden blocks accessible to the solid state drive in the NVMe operational mode.

19. The solid state drive of claim 15, the controller further configured to:
on condition that the password length is equal to 32 bytes, transforming the Secure Digital mode password to an Advanced Technology Attachment (ATA) security protocol password and applying the ATA security protocol password to unlock the solid state drive.

20. The solid state drive of claim 15, the controller further configured to:
on condition that the password length is not equal to 32 bytes, read the Secure Digital mode password from the Secure Digital mode password hidden blocks and append to the Secure Digital mode password a number of zeros equal to a difference between 32 and the password length.

* * * * *